A. BOWMAN.
MOWING MACHINE.
APPLICATION FILED APR. 18, 1918.
1,329,698.
Patented Feb. 3, 1920.
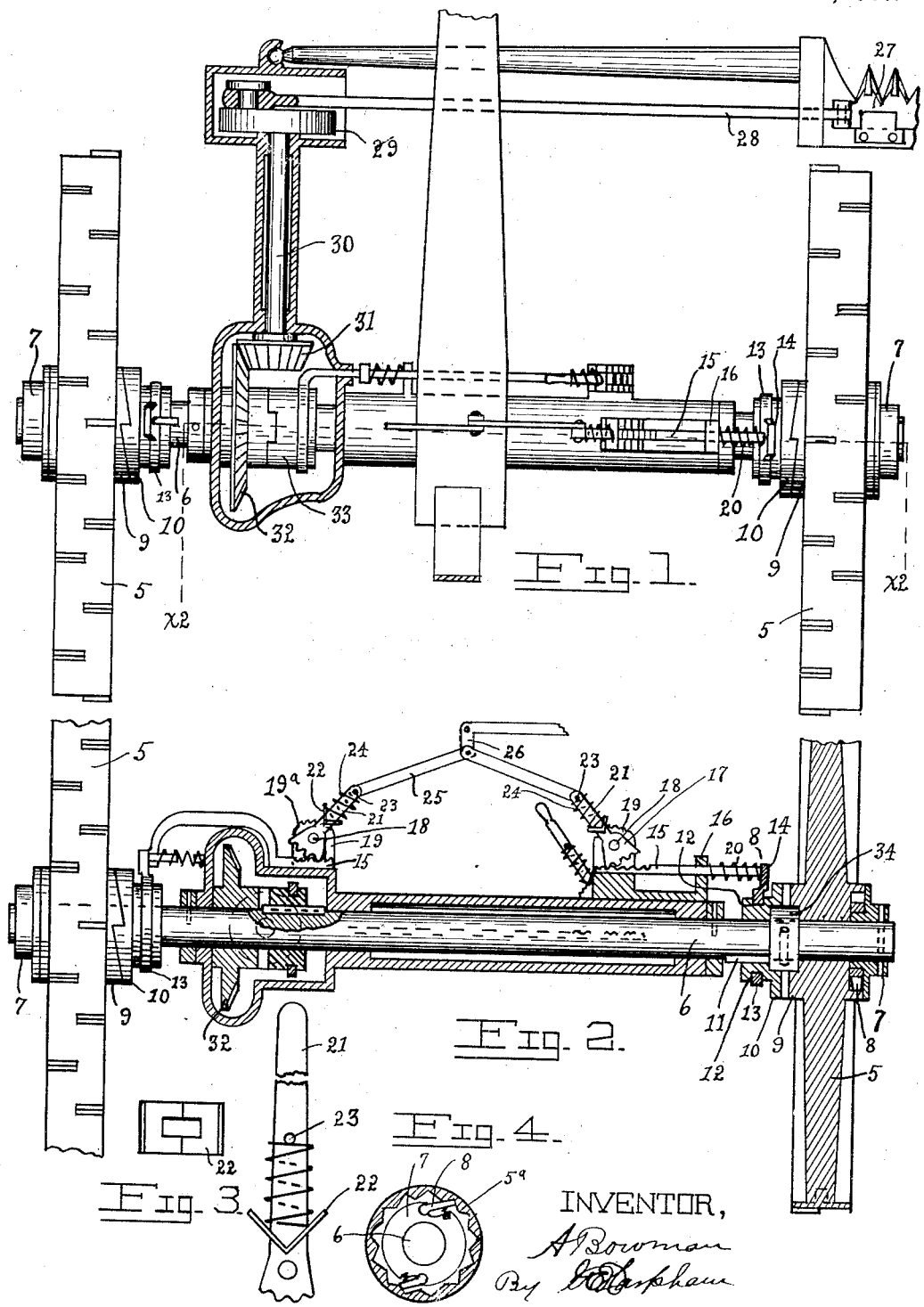
INVENTOR,
A. Bowman
By
ATTORNEY.

UNITED STATES PATENT OFFICE.

ABE BOWMAN, OF LONG BEACH, CALIFORNIA.

MOWING-MACHINE.

1,329,698. Specification of Letters Patent. Patented Feb. 3, 1920.

Application filed April 18, 1918. Serial No. 229,411.

*To all whom it may concern:*

Be it known that I, ABE BOWMAN, a citizen of the United States, residing at the city of Long Beach, in the county of Los Angeles, State of California, have invented new and useful Improvements in Mowing-Machines, of which the following is a specification.

Heretofore, in machines for cutting grass, grain and other vegetation, it has been the custom to drive the sickle in one direction only. It often happens when machines of this construction are used that the sickle becomes clogged by the material being cut, and it is necessary to free the same. Heretofore, it has been necessary to back the machine and then for the operator to pull out the clogging material from between the sickle teeth to release the sickle. This takes time and sorely tries the temper of the operator. By my improvement I provide additional clutches which when thrown into action and the machine is backed—cause the sickle to run backward and thereby free itself from the clogging material.

In the drawing forming a part of this application:

Figure 1 is top plan of so much of a machine equipped with my invention as is necessary to illustrate the same.

Fig. 2 is a section of the line 2—2 of Fig. 1.

Fig. 3 is an enlarged side view of a detent and lever forming a part of my invention.

Fig. 4 is a detail of the outer clutch.

Referring to the drawings, 5 are the driving wheels of a machine for cutting grass, grain and other vegetable matter, which are revolubly mounted on shaft 6. On the outer ends of shaft 6 are secured ratchet hubs, one of which 7 is shown in section at the right in Fig. 2. These ratchet hubs carry dogs 8, which dogs engage ratchet teeth 5ª on the wheels and drive shaft 6 when the machine is pulled in the direction to cut grass or other material. When the machine is backed the dogs slip over ratchet teeth and shaft 6 does not rotate. Secured to shaft 6, near the ends thereof, are collars 34, which, with the ratchet wheels hold wheels 5 positioned on shaft 6. Secured to the inner face of the driving wheels and surrounding axle 6, are the outer members 9 of the clutches which connect axle 6 to the driving wheels so that when the clutch members are engaged and the machine is backed, the axle will be revolved. The clutches for both wheels are alike and only one will be described. The inner clutch member 10 is slidably mounted on axle 6 by spline 11 and rotates with the axle, and when thrown into engagement with the outer member locks the wheel to the axle so that when the machine is backed the axle is revolved, and through connecting mechanism the sickle is caused to move reversely to its cutting motion. This connecting mechanism is not further described, as it is the usual mechanism by means of which the sickle is driven when cutting grass or other material. The inner clutch member is provided with an annular groove 12 in its hub, in which is carried a band 13, having an arm 14 secured thereto. A rack bar 15 is secured to arm 14 and passes through a bearing 16 secured to the frame of the machine, and is engaged by a toothed sector 17, pivoted at 18 in bearings 19 secured to the frame of the machine. Between bearing 16 and arm 14 is a spring 20 which normally holds the inner clutch member 10 into engagement with the outer clutch member 9. Sector 17 has an arm or lever 21 on which is slidably mounted a V-shaped detent 22, and through which passes a pin 23. Between pin 23 and detent 22 is a coiled spring 24 surrounding arm 21 which spring causes detent 22 to engage ratchet teeth 19ª, cut in the circular top of bearing 19. Arms 21 of each clutch may be connected by a toggle 25 operated by a lever 26 so that both of the inner clutch members may be operated at one time and thrown into or out of engagement with the outer clutch members. When the sickle is cutting these clutch members are disengaged, but when the sickle becomes clogged they are thrown into engagement, and as the machine is backed the sickle is moved reversely to its cutting motion, thereby freeing itself from the clogging material. I have illustrated one form of mechanism for operating the sickle when the machine is backed, but it is obvious that other forms can be used. The essential element in my device is mechanism which can be operated at will to cause the sickle to move in a reverse direction to its cutting motion when the machine is backed, and which is held inoperative when the sickle is cutting. In the form of mechanism illustrated, 27 is the sickle, 28 the pitman, 29 the flywheel and crank which is mounted on shaft 30 that carries bevel pinion 31, which pinion meshes with bevel gear 32 loosely mounted on shaft 6. Clutch 33 connects gear 32 to shaft 6 when desired.

Having described my invention, I claim—

1. In a mowing machine in which a sickle does the cutting—an axle; driving wheels mounted thereon; an outer clutch member secured to the inner side of the driving wheel; an inner clutch member splined to and slidable upon the axle, said outer and inner clutch members being adapted to lock the driving wheel to the axle when the machine is backed, and means to operate the inner clutch member.

2. In a mowing machine in which a sickle does the cutting—an axle; driving wheels mounted thereon, an outer clutch member secured to the inner face of the driving wheel, an inner clutch member splined upon the axle; said inner member having an annular groove in its hub, a band surrounding said hub within said groove and having an arm, a rack bar connected to said arm; bearings secured to the frame having teeth in their upper surfaces; a sector mounted in said bearings and engaging said rack bar, a lever secured to said sector; a pin projecting through said lever; a V-shaped detent plate mounted for sliding movement on said lever and adapted to engage the teeth of said bearings, and a spring surrounding said lever between said pin and detent plate.

In witness that I claim the foregoing I have hereunto subscribed my name this 1st day of April, 1918.

ABE BOWMAN.